United States Patent [19]

Corfe et al.

[11] Patent Number: 5,049,722
[45] Date of Patent: Sep. 17, 1991

[54] LASER BARRIER MATERIAL AND METHOD OF LASER DRILLING

[75] Inventors: Arthur G. Corfe; David Stroud, both of Bristol, England

[73] Assignee: Rolls-Royce plc, London, England

[21] Appl. No.: 582,169

[22] Filed: Sep. 14, 1990

[30] Foreign Application Priority Data

Sep. 16, 1989 [GB] United Kingdom ............... 8921040

[51] Int. Cl.$^5$ ............................................. B23K 26/00
[52] U.S. Cl. ........................... 219/121.71; 219/121.85
[58] Field of Search ............ 219/121.7, 121.71, 121.6, 219/121.85

[56] References Cited

U.S. PATENT DOCUMENTS

| | | | |
|---|---|---|---|
| 3,410,979 | 11/1968 | Larsson | 219/121.7 |
| 4,156,807 | 5/1979 | Howard et al. | 219/121.35 |
| 4,447,734 | 5/1984 | Kusumegi et al. | 250/517.1 |
| 4,873,414 | 10/1989 | Ma et al. | 219/121.7 |

FOREIGN PATENT DOCUMENTS 1228438 4/1971 United Kingdom .

Primary Examiner—C. L. Albritton
Attorney, Agent, or Firm—Oliff & Berridge

[57] ABSTRACT

PTFE-loaded wax is used in the laser drilling of holes in hollow turbine blades to prevent strike-through of the beam to an opposite wall of a cavity in the blade. The PTFE-loaded wax is poured or injected in molten form into the cavity prior to laser-drilling, and is subsequently removed by steaming.

12 Claims, 1 Drawing Sheet

LASER BARRIER MATERIAL AND METHOD OF LASER DRILLING

BACKGROUND OF THE INVENTION

This invention relates to laser drilling of components, particularly, although not exclusively, the drilling of holes in gas turbine components such as hollow turbine blades.

The laser drilling of holes such as film-cooling holes into internal passages of turbine blades has been known for some time. However, a problem that commonly arises is that of preventing the laser beam from damaging the wall of the passage opposite to where the laser beam breaks through. Another problem that arises is that of preventing material sputtered or vaporised by the beam from being deposited on the inner surfaces of the passage.

Attempts have been made to insert barriers in the passages, and indeed in passages which are relatively large and do not have complicated shapes it may be possible to use solid barriers.

Attempts have been made to pour molten wax into the passage prior to laser drilling so that on solidification it provides a useful barrier. However, a problem arises when a series of holes close together in a blade is being drilled. It is found that the solid wax in the passage can melt in the vicinity of a hole being drilled and can form an unwanted cavity under the site of a second hole to be drilled, thus reducing resistance to laser strike-through when that second hole is subsequently drilled.

SUMMARY OF THE INVENTION

A first object of the present invention is to provide a laser barrier material in a cavity in a component through a wall of which a hole into the cavity is to be drilled by means of a laser beam, wherein the barrier material is easily inserted into and fills the cavity, is self-supporting within the cavity, is effective in preventing the laser beam from damaging surfaces within the cavity, resists the formation of further cavities in regions adjacent the hole currently being drilled, and is easy to remove.

A second object of the present invention is to provide a method of laser drilling a hole through a wall of a hollow component into a cavity therein without damaging an interior surface of the cavity opposite the hole.

According to a first aspect of the present invention there is provided a barrier material for use in laser machining of a component to protect a surface of the component which is in the path of the laser beam from being machined, the barrier material comprising a wax base containing polytetrafluoroethylene in fine granule form.

According to a second aspect of the present invention there is provided a method of laser drilling a hole through a wall of a hollow component into a cavity within the component, the method comprising the steps of,
(a) coating a surface of the cavity opposite said wall with a barrier material comprising a wax base containing polytetrafluoroethylene in fine granule form,
(b) drilling a hole through said wall with a laser beam, and
(c) subsequently removing the barrier material from the cavity by steaming, whereby during step (b) said surface is protected from machining by the laser beam by virtue of the barrier material.

BRIEF DESCRIPTION OF THE DRAWING

The invention will now be described by way of example only with reference to the accompanying diagrammatic FIG. 1 which shows a transverse section through a hollow turbine blade, and with reference to the Example.

DESCRIPTION OF PREFERRED EMBODIMENTS

Figure 1:
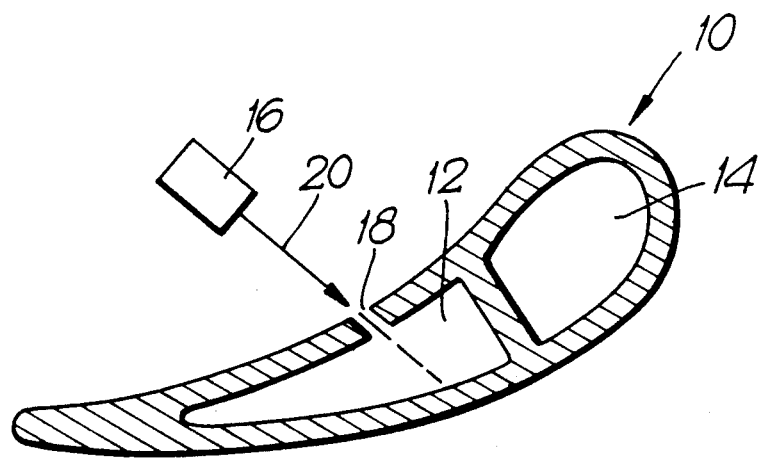

Referring to FIG. 1 there is shown in transverse section a gas turbine blade 10 having internal longitudinally extending cavities 12,14. There is provided a laser source 16 to drill a film-cooling hole 18 through to cavity 12 (for example) by means of a laser beam 20.

EXAMPLE

A barrier material was prepared from a 50/50 vol/weight mixture of polytetrafluoroethylene micropowder of the consistency of talcum powder (DLX6000 PTFE manufactured by E. I. Du Pont de Nemours and Company), having an average particle radius of from 0.01 to 3 microns, in a wax base comprising low melting point casteleyne wax.

Prior to the drilling of hole 18 into cavity 12 the barrier material as prepared above was melted and injected into the cavity from one end of the blade, and allowed to cool and solidify. It was found, on using the laser to drill hole 18 into the barrier-filled cavity, that the PTFE provided an effective barrier against laser light, thus preventing "strike-through" of laser light to the opposite wall of the cavity and augmenting any prevention of strike-through attributable to the wax per se. Furthermore, it was found that the PTFE stabilised the wax by forming a matrix and prevented the formation of unwanted cavities in the wax adjacent the hole currently being laser-drilled.

When the desired number of air-cooling holes were drilled in the blade the PTFE-wax matrix was removed from the cavity by steaming.

It was found that barrier compositions containing PTFE in the range 10–60% vol/weight may be utilised.

Waxes other than that exemplified may also be used in the barrier material, provided they are such that they can be easily removed after the drilling process. Suitably, such waxes will have melting points less than 100° C., so that the barrier may be conveniently steamed out of the cavity.

The barrier may, in some circumstances, be poured into the cavity instead of being injected, or may even be sprayed or painted onto the surface to be protected.

Although the present invention has been described above in connection with preferred embodiments, it will be appreciated by those skilled in the art that additions, modifications, substitutions and deletions not specifically described may be made without departing from the spirit and scope of the invention defined in the appended claims.

We claim:
1. A barrier material for use in laser machining of a component to protect a surface of the component which is in the path of the laser beam from being machined, the barrier material comprising a wax base containing polytetrafluoroethylene in fine granule form.

2. A barrier material as claimed in claim 1 wherein the wax base is a low melting point wax and the polytetrafluoroethylene is of an average granule size less than about 3 microns radius.

3. A barrier material as claimed in claim 2 wherein the wax is castelyne wax.

4. A barrier material as claimed in claim 1 wherein the percentage of polytetrafluoroethylene in the material is within the range 10–60% volume/weight.

5. A barrier material as claimed in claim 4 wherein the percentage of polytetrafluoroethylene is 50% volume/weight.

6. A method of laser drilling a hole through a wall of a hollow component into a cavity within the component, the method comprising the steps of,
   (a) coating a surface of the cavity opposite said wall with a barrier material comprising a wax base containing polytetrafluoroethylene in fine granule form,
   (b) drilling a hole through said wall with a laser beam, and
   (c) subsequently removing the barrier material from the cavity by steaming,
   whereby during step (b) said surface is protected from machining by the laser beam by virtue of the barrier material.

7. A method as claimed in claim 6 wherein step (a) is carried out by melting the barrier material and injecting or pouring it in molten form into the cavity and permitting it to solidify before step (b) is carried out.

8. A method as claimed in claim 6 wherein the wax base is a low melting point wax and the polytetrafluoroethylene is of an average granule size less than about 3 microns radius.

9. A method as claimed in claim 8 wherein the wax is wax having a melting point less than 100° C.

10. A method as claimed in claim 9 wherein the wax is castelyne wax.

11. A method as claimed in claim 6 wherein the percentage of polytetrafluoroethylene in the material is within the range 10–60% volume/weight.

12. A method as claimed in claim 11 wherein the percentage of polytetrafluoroethylene is 50% volume/weight.

* * * * *